(12) United States Patent
Warren et al.

(10) Patent No.: US 9,654,606 B1
(45) Date of Patent: May 16, 2017

(54) MULTIFUNCTIONAL MOBILE DEVICE CASE

(71) Applicant: Boomerang, Inc., Columbia, MD (US)

(72) Inventors: Christopher Warren, Ellicott City, MD (US); David Bogle, Columbia, MD (US); Ryan Bogle, Columbia, MD (US)

(73) Assignee: Boomerang Innovations, Inc., Columbia, MD (US)

( * ) Notice: Subject to any disclaimer, the term of this patent is extended or adjusted under 35 U.S.C. 154(b) by 0 days.

(21) Appl. No.: 15/147,189

(22) Filed: May 5, 2016

Related U.S. Application Data

(60) Provisional application No. 62/157,071, filed on May 5, 2015.

(51) Int. Cl.
*H04B 1/38* (2015.01)
*H04M 1/00* (2006.01)
*H04M 1/02* (2006.01)

(52) U.S. Cl.
CPC .................................. *H04M 1/026* (2013.01)

(58) Field of Classification Search
CPC .... H04B 1/3883; H02J 7/0044; H02J 7/0054; H02J 2007/0062
USPC .......................... 455/575.8, 114, 573, 575.1
See application file for complete search history.

(56) References Cited

U.S. PATENT DOCUMENTS

| | | | |
|---|---|---|---|
| 8,390,255 B1 | 3/2013 | Fathollahi | |
| 8,403,247 B2 | 3/2013 | Chen | |
| 8,774,446 B2 | 7/2014 | Merenda | |
| 8,879,773 B2 | 11/2014 | Merenda | |
| 2008/0053770 A1 | 3/2008 | Tynyk | |
| 2012/0319487 A1* | 12/2012 | Shah | H02J 9/062 307/66 |
| 2013/0020425 A1 | 1/2013 | Grassi | |

(Continued)

FOREIGN PATENT DOCUMENTS

WO    2013165878    11/2013

OTHER PUBLICATIONS

"PocketPlug by Prong | Take Charge With This Innovative iPhone Case," https://prong.com/pocketplug-iphone-5, Apr. 30, 2015.

(Continued)

*Primary Examiner* — Simon Nguyen
(74) *Attorney, Agent, or Firm* — Fitzpatrick, Cella, Harper & Scinto

(57) ABSTRACT

A mobile device case contains an onboard retractable charging and/or data cord, preferably a USB cable or other equivalent, which allows the user to charge on the go from an available USB port without carrying an external charging cord or transformer adapter. The mobile device case can use various optional interchangeable tops that allow the user the ability to switch tops for the case. Optional tops include a simply top to secure the device into the lower base of the case, a top that contains a supplemental battery that, by engaging a switch on the top, transfers power to the mobile device's battery, and a top which serves as a transformer adapter. The latter top contains a USB:port (or equivalent) and fold-out prongs that can be plugged into an outlet. Furthermore, an improved electrical contact system permits an electrical connection between a reel for the retractable cord and a mobile device contact pin without metal-on-metal contact while the reel is moving.

12 Claims, 17 Drawing Sheets

(56) References Cited

U.S. PATENT DOCUMENTS

| | | | |
|---|---|---|---|
| 2013/0150134 A1 | 6/2013 | Pliner | |
| 2013/0320913 A1 | 12/2013 | Chen | |
| 2014/0035511 A1* | 2/2014 | Ferber | H02J 7/0042 320/103 |
| 2014/0174846 A1 | 6/2014 | Molinaro | |
| 2014/0253038 A1* | 9/2014 | Posa | H02J 7/0044 320/111 |
| 2015/0028797 A1* | 1/2015 | Miller | H02J 7/0042 320/103 |
| 2015/0156297 A1 | 6/2015 | Crawford | |
| 2015/0364875 A1* | 12/2015 | Ginsberg | H01R 13/72 320/114 |
| 2016/0043514 A1* | 2/2016 | George | H01R 13/72 439/501 |
| 2016/0141898 A1* | 5/2016 | Riphin | H02J 7/0044 320/114 |
| 2016/0204816 A1* | 7/2016 | Abramovich | H04B 1/3888 455/575.8 |

OTHER PUBLICATIONS

"PWR Case by Prong | Take Charge With This Innovative iPhone Case," https://prong.com/pwrcase-iphone-6, Apr. 3, 2015.
"Samsung Galaxy Avant Retractable Home Wall Charger," http://www.hedocell.com/Samsung-Galaxy-Avant-Retractable-Home-Wall-Charger.html, Apr. 30, 2015.

* cited by examiner

MULTIFUNCTIONAL MOBILE DEVICE CASE

CROSS-REFERENCE TO RELATED APPLICATION

This application claims priority to U.S. Provisional Application No. 62/157,071, filed on May 5, 2015, which is herein incorporated by reference.

FIELD OF THE INVENTION

This invention relates to the field of mobile electronic device accessories. These mobile devices include but are not limited to cell phones, tablets, laptop computers and electronic games. More specifically, the invention relates to mobile device cases that provide optional methods of charging the mobile device and/or data transfer to and from the mobile device.

DESCRIPTION OF THE RELATED ART

There are many known cases for mobile devices. Many are designed primarily to protect the device in the event the device falls or receives an impact. Hence, the primary function for the majority of cases for mobile devices is protection.

These well-known cases are made from shock-absorbing materials that minimize the chance of the device being damaged. The most sensitive areas of mobile devices are the glass or plastic screens. Most cases provide a protruding edge around the glass so that upon impact from a fall the glass is protected from direct contact with the ground. Some of these cases are constructed using both elastic absorbent materials in combination with more rigid materials such as rubber and/or polycarbonate.

The cases are designed in a way that allows access to the device's buttons, switches, or plugs. Access to the device's ports is especially needed to recharge the device's rechargeable battery using a charging cord provided or purchased with the mobile device. Most charging cords come with a transformer adapter that regulates the voltage required to charge the device's battery.

The charging cord in most situations utilizes a USB connection into a transformer adapter, and that USB cord is also used to transfer data to or from the mobile device. The USB cord will also charge the device when plugged into any USB port.

Newer mobile devices have become larger due to the demand for more screen size for viewing media and for gaming. The larger screens and increased functionality of mobile devices require more energy, which in turn requires bigger batteries to operate the device. Due to the growing dependency on mobile devices, sustaining battery life while on the go has created challenges.

In recent years some mobile device cases have been developed to include an onboard extra battery that allows the user to extend power to the device for longer periods of time while on the go, before having to recharge the device's battery. The onboard battery built into the case allows the user to activate a switch that then transfers power from the onboard battery to the mobile device's battery. These cases with the onboard batteries in some instances extend the device's usability as much as an additional 50, 70, 100 or 150 percent.

Other cases have been designed to include an onboard battery as well as fold-out transformer adapter prongs, allowing the user to not only extend the usability of the mobile device while on the go, but also to recharge the device using the fold-out prongs to plug the case directly into an outlet.

In both the onboard battery case and the case with an onboard battery and transformer adapter prongs, once the battery is drained the user can no longer use the device. If the user does not have with them a power charging cord, the user may not be able to charge the device and, even if the case has transformer adapter prongs built into the case, the case must be plugged directly into the wall and the device cannot be used for talking or data transfer while it is charging (or at least not used conveniently). Oftentimes it is difficult if not impossible for mobile device users to remember to maintain a charger cord and/or adapter in their possession while on the go. Charger cords & adapters end up lost or forgotten.

Transformer adapters are known that include a retractable cord. However, such transformer adapters still require the mobile device user to remember to have with them an item in addition to the mobile device, and therefore such transformer adapters are still susceptible to being lost or forgotten.

SUMMARY OF THE INVENTION

The present invention provides an improved case with the ability to charge a mobile device, transfer data to and/or from the mobile device, and/or continue to use the mobile device while it is charging even when the user is on the go, without the need to carry an external cord and transformer adapter. In addition, the present invention eliminates the chances of losing the charger and/or cord while the user is on the go.

According to one aspect of the present invention, a mobile device case contains an onboard retractable charging and/or data transfer cord, which is preferably a USB cable or equivalent. Having an onboard retractable cord allows the user to charge on the go via a USB charging port and/or transfer data without carrying an external charging cord.

According to another aspect of the present invention, a mobile device case is configured to accept interchangeable tops, which allows the user the ability to change tops for the case depending on the user's needs. Exemplary case tops include a simple top that secures the device into the lower base of the case, a top that contains a supplemental battery from which the device can obtain power, and a top that serves as a transformer adapter. The latter top contains a USB port (or equivalent), which allows the user to remove the top, fold out the outlet prongs, and plug the top into an outlet. The user can then extend the onboard retractable charging cord (USB cable or equivalent) and plug it into the top, allowing the mobile device to be charged while the user can still operate the mobile device.

According to still another aspect of the present invention, an alternative electrical contact system is provided that enables transfer of power and/or data between a retractable USB cable and a mobile device with enhanced performance due to the elimination of contact between moving metal parts.

BRIEF DESCRIPTION OF THE DRAWINGS

FIG. 2-B shows a rear view of one embodiment of the invention in the assembled state.

FIG. 2-C shows the internal mechanisms allowing the cord to extend and retract.

FIG. 7-B shows a front view of a third embodiment of the invention when fully assembled.

FIG. 7-C shows a rear view of another embodiment of the invention.

FIG. 8-B shows a bottom view of a reel assembly.

FIG. 8-C shows the tables of a retaining clip for securing a cord to a reel.

FIG. 8-D shows a side view of a cord and a retaining clip.

DETAILED DESCRIPTION OF THE PREFERRED EMBODIMENTS

Figure 1:
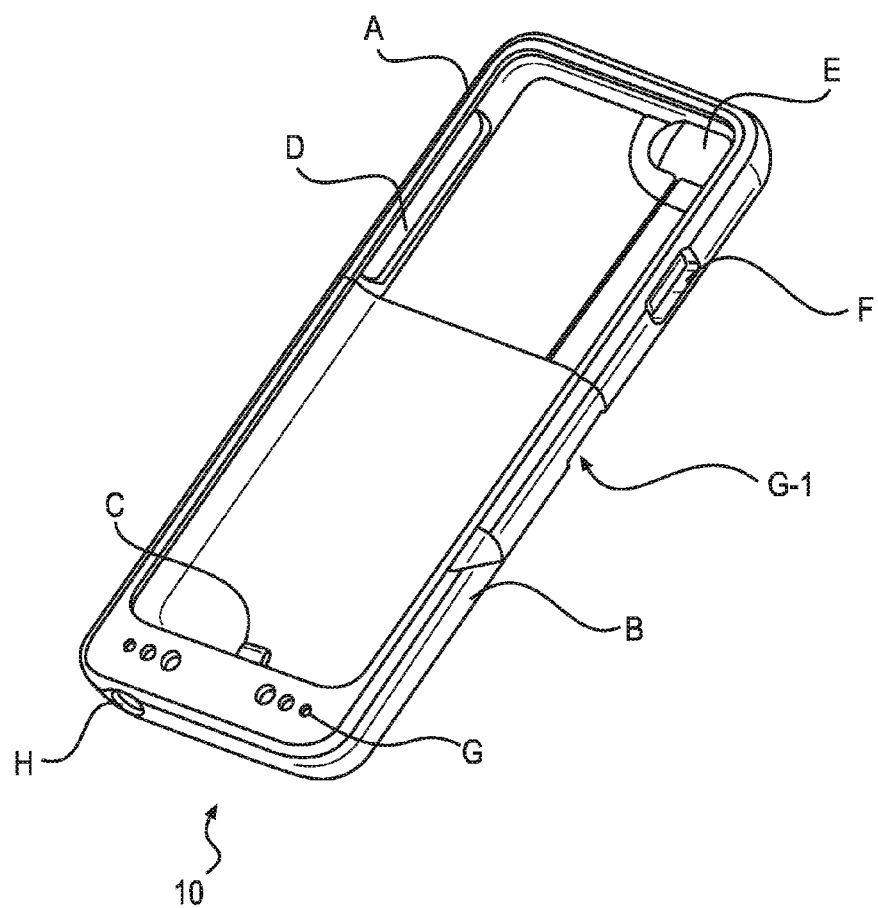
FIG. 1 is a perspective view showing one embodiment of the invention in its assembled state.

FIG. 1 shows a perspective view of one embodiment of the present invention in the assembled state. The mobile device case 10 shown in this embodiment is a two-part case having a top A and a bottom B. In this example the case is intended for a cell phone. The case 10 in this embodiment has a contact pin C in the bottom portion for connecting to the charging port on the mobile device. The case 10 also includes a button access slot D, a camera/flash opening E, a button switch access F, speaker/microphone vents G, micro USB charging port G-1, and a phone jack port H. It will be appreciated that the number and location of access slots, vents, and other openings, as well as the dimensions of the case 10, can be modified to suit a specific mobile device.

Figure 2A:
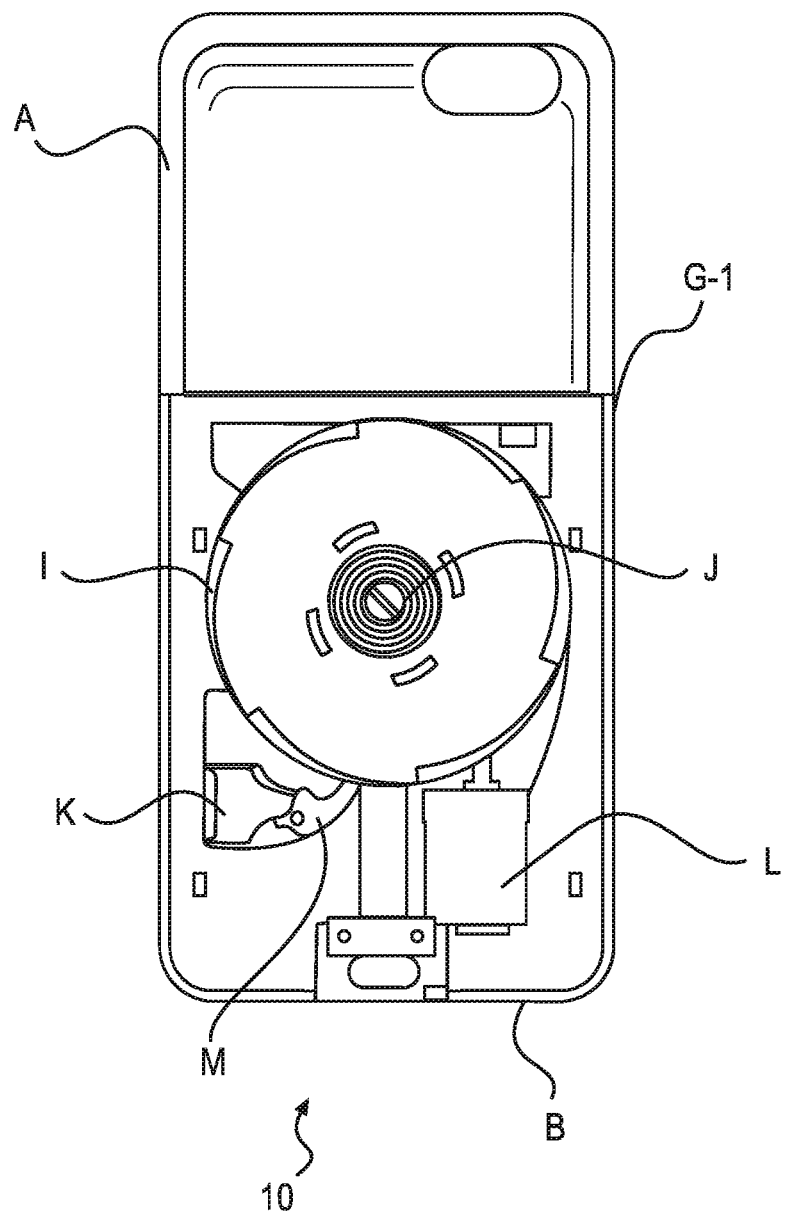
FIG. 2-A is a perspective view showing the inside of one embodiment of the invention.
Figure 2B:
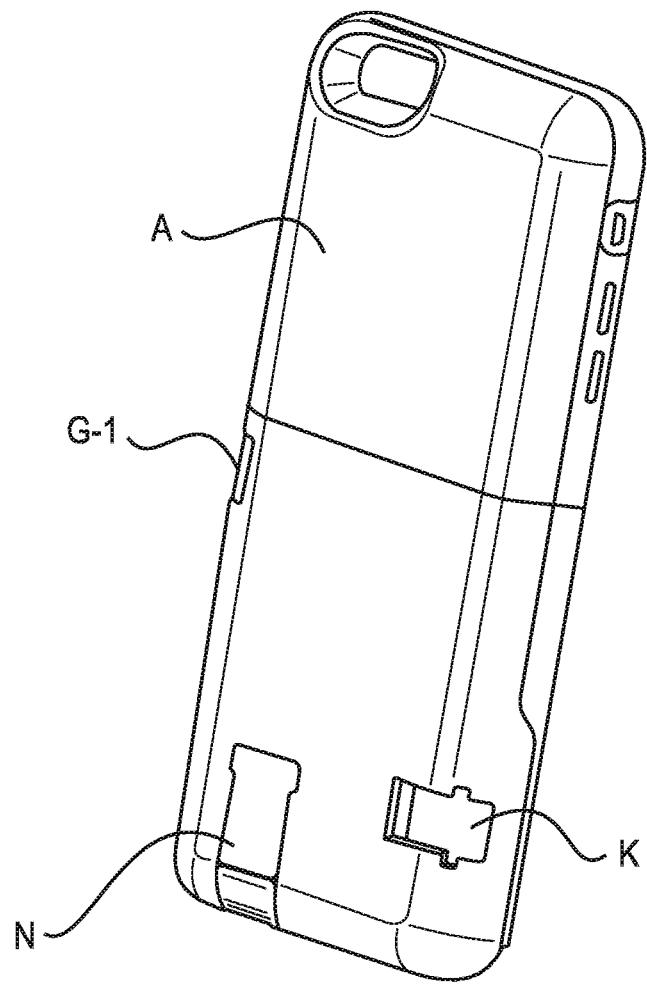
Figure 2C:
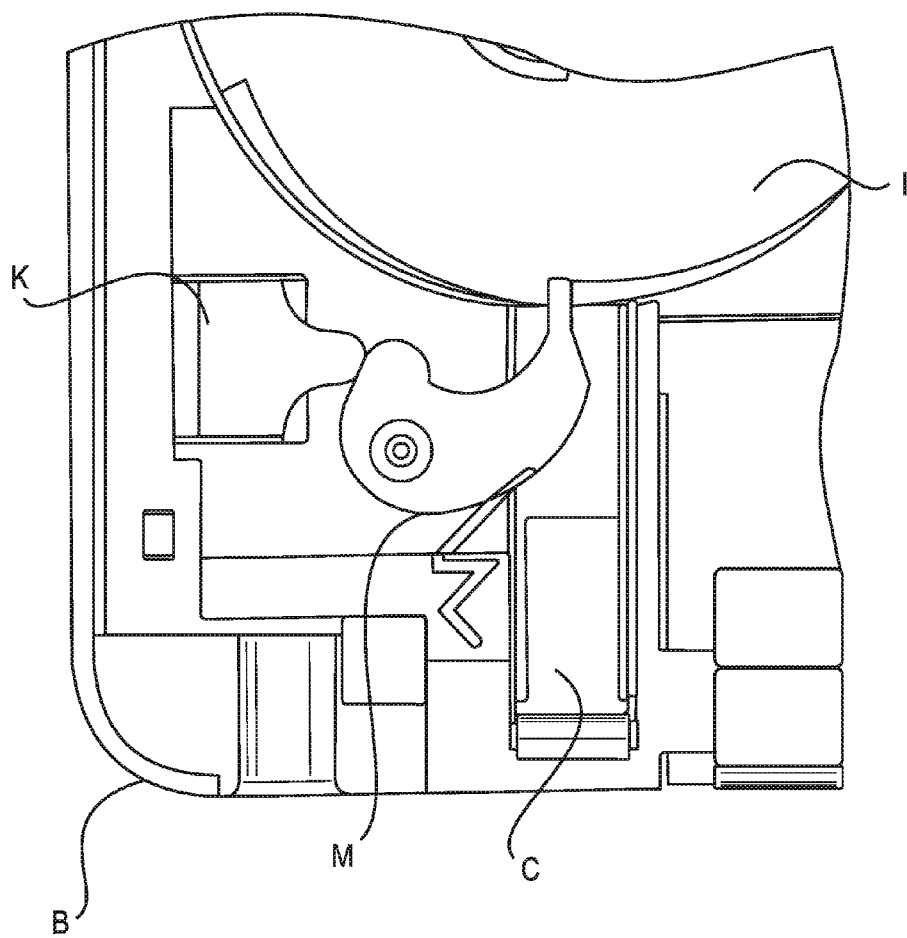

As shown in FIG. 2-A, built into the bottom part B of the case 10 is a retractable USB charging/data cord L. In further detail, FIG. 2-A shows a retractable reel assembly I, a flat spring coil J, a reel release button K and a pawl and ratchet mechanism M. The cord L is wrapped around the reel assembly I. The flat spring coil J is a heat treated constant force flat spring (spring steel). When the cord L is unwound, the spring steel coil J unwinds creating a resistant force which urges the reel to rewind the cord around the reel. The pawl & ratchet mechanism M is incorporated to allow the user to extend and lock the cord L when extended at various lengths. In most cases the cord L can retract out as much as 2 to 4 feet or as little as 1 to 11 inches. This allows the user options: retract the cord out slightly and charge or transfer data and not use the device or retract the cord out fully and charge and continue to use the mobile device at the same time. It will be appreciated that various lengths could be used for cord L. The reel release button K, when depressed, releases the pawl and ratchet mechanism M which in turn releases the locked reel assembly I to allow the cord L to automatically rewind back onto the reel and back into the case due to the force of flat spring coil J.

The cord L and retractable reel assembly I are contained in a compartment in the back bottom portion of the case. As shown in FIG. 2-B, the case 10 has a compartment door N on the back of the case. The retractable cord L is accessible by opening door N, which allows the end of the cord L to be grasped with the fingertips and pulled out. FIG. 2-C shows an expanded view of the components for extending and retracting the built-in cord.

One method of charging the device's battery using the USB cord is to plug the retractable USB cord directly into any standard USB port, such as those found in some computers, cars, airports, televisions, or transformer adapters.

Figure 3:
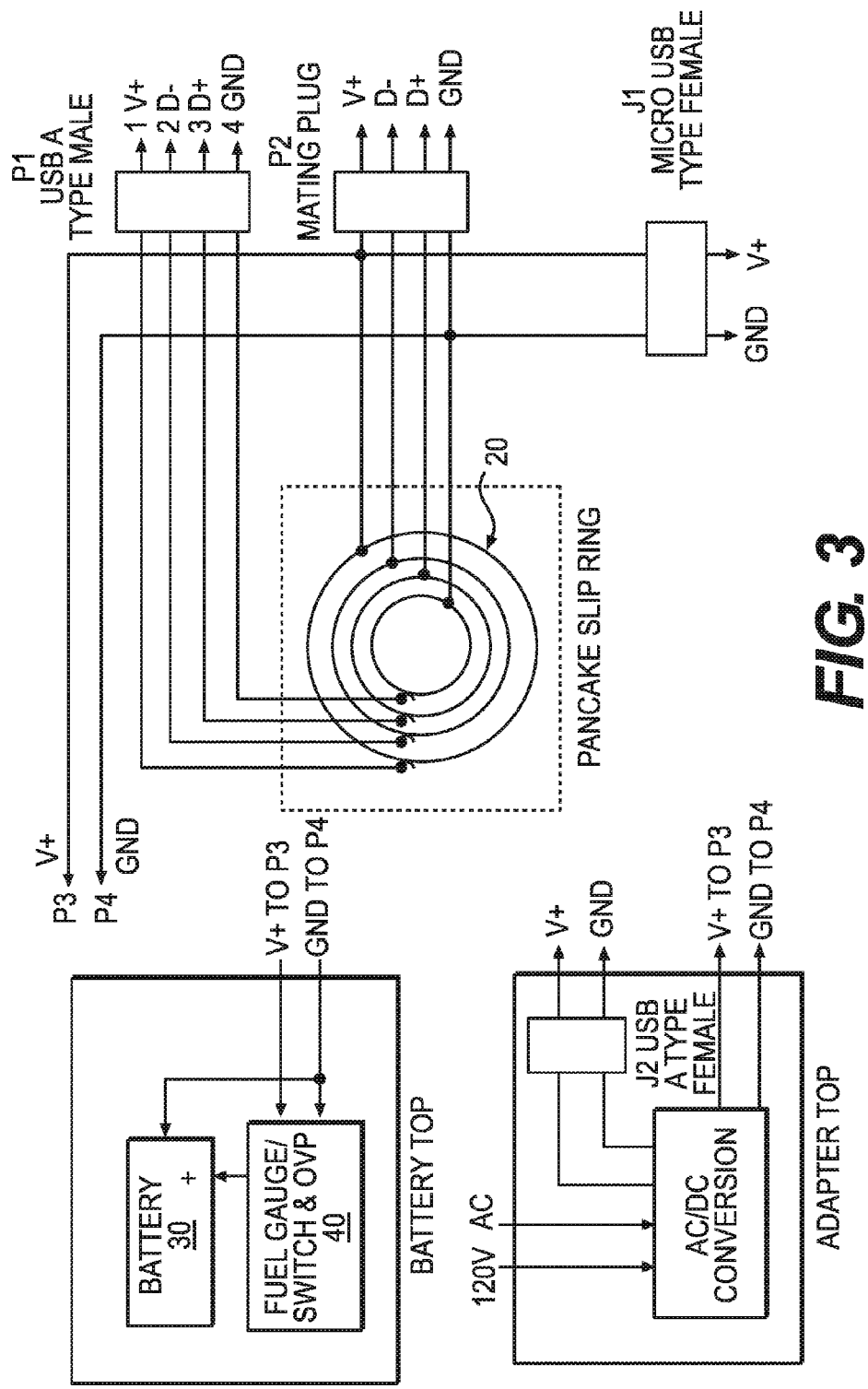
FIG. 3 is a schematic view illustrating the electrical connections for power transfer between various components.

FIG. 3 shows how power is routed through a pancake slip ring 20 (a circular disc-shaped component containing 4 or more flat metal bands that make contact with terminated wires from the cord's positive and negative contacts as well as the cord's data contacts. The bands of the pancake slip ring 20 are then terminated to the contact pin C that plugs directly into the mobile device. The contact pin C is rigidly fixed into the lower portion of the case and is connected to the mobile device when the mobile device is placed into the case. The onboard retractable USB gives the user the convenience of always having a means of charging or transferring data to or from the mobile device without remembering or having to carry a separate charging cord. Those skilled in the art will appreciate that there are other configurations and components that may be used to make the described electrical connections.

Figures 8A, 8B, 8C, 8D:
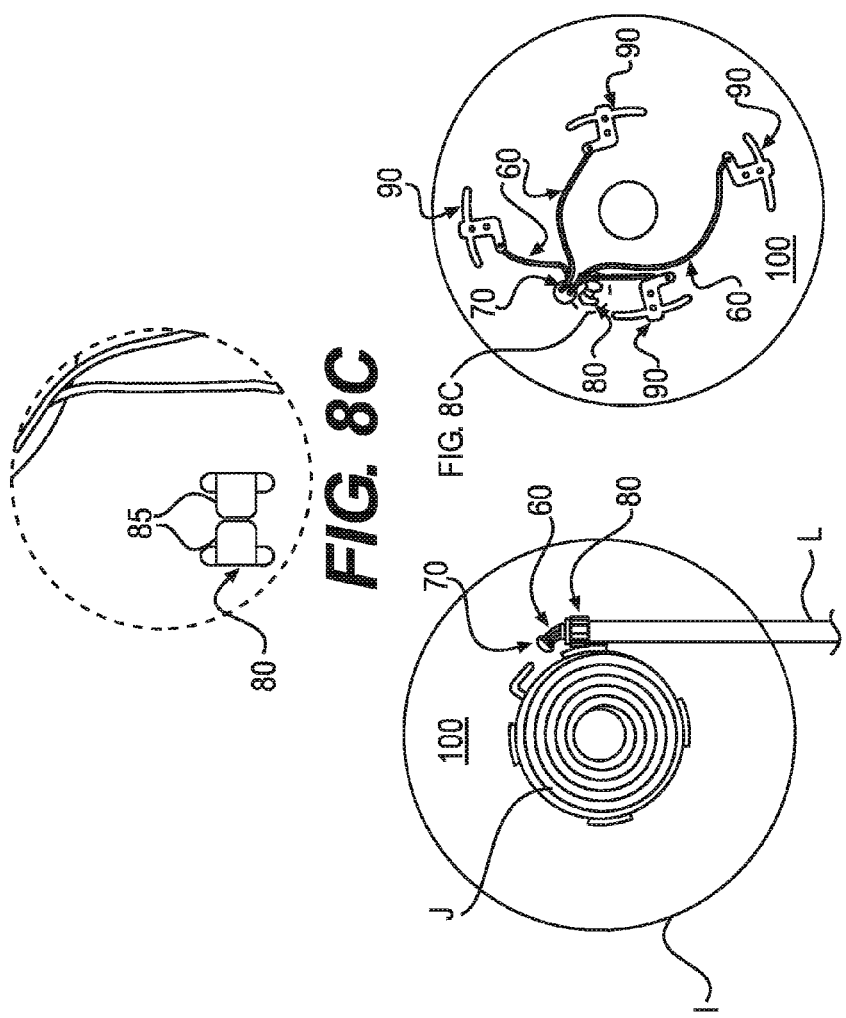
FIG. 8-A shows a top view of a reel assembly.

FIGS. 8-A through 8-D show one embodiment for attaching the cord L to the reel assembly I. This embodiment ensures that the internal end of the cord L is secured to the reel assembly so that it will not be pulled loose when the cord is extracted from the mobile device case. Those skilled in the art will appreciate that there are several possible variations for attaching the cord to the reel assembly. FIG. 8-A is a top view of the reel assembly I. The connector on the internal end of cord L is removed to expose cord wires 60 of the cord L. The cord wires 60 are threaded through a hole 70 in a reel 100 of the reel assembly I. The cord L is attached to the reel 100 using a retaining clip 80 that secures the cord to the reel 100, thus preventing the attached end of the cord L from being pulled loose when the cord is extracted from the mobile device case. FIG. 8-B is a bottom view of the reel 100. The cord wires 60 threaded through hole 70 are soldered to respective metal slip ring contacts 90 on the bottom of the reel 100. FIG. 8-C shows that the retaining clip 80 has tabs 85 that pass through the reel 100 and are bent to secure the cord L to the reel 100. FIG. 8-D is a side view of cord L showing the retaining clip 80 and its tabs 85.

Figure 9:
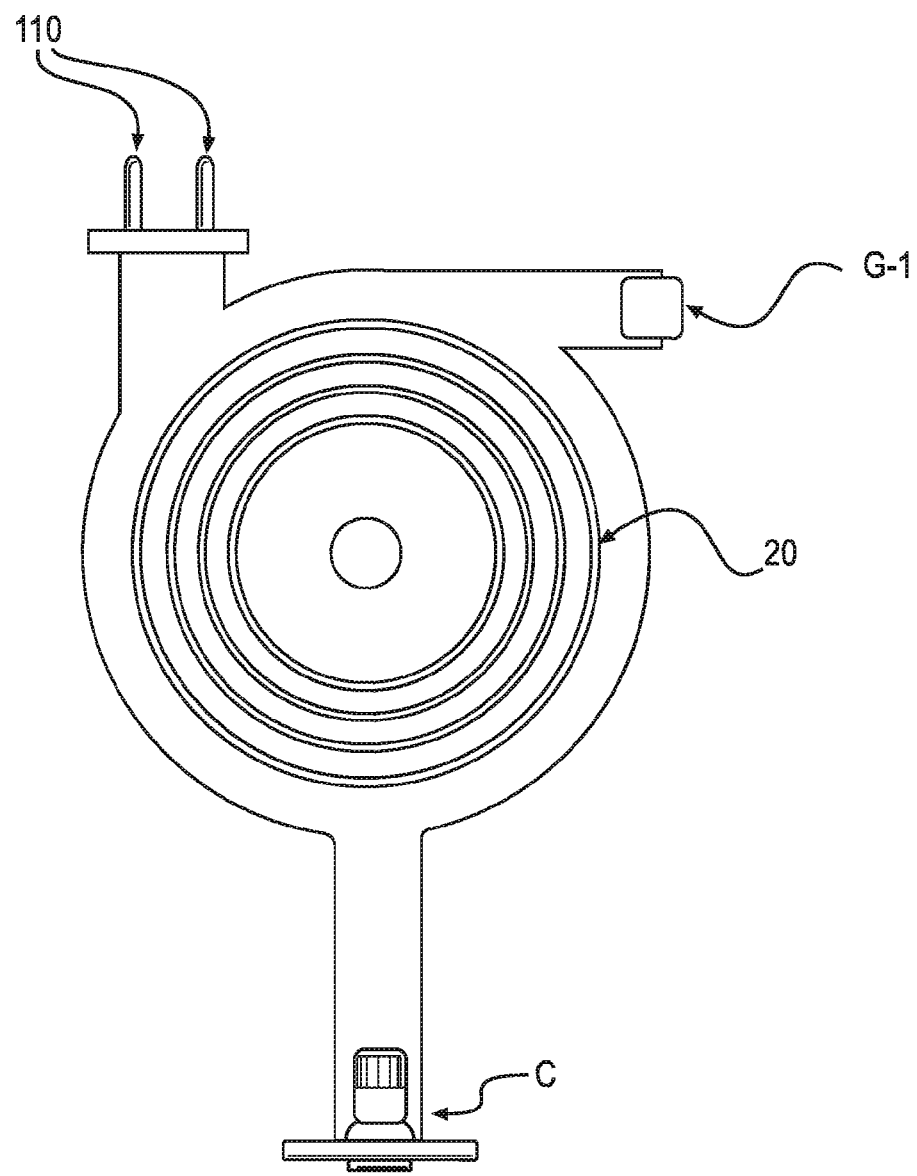
FIG. 9 shows a pancake slip ring and components electrically connectable to it.
Figure 10:
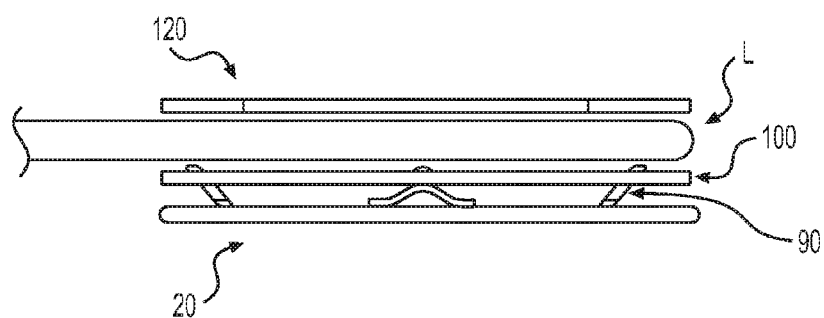
FIG. 10 shows a cross-sectional view of a reel assembly and a pancake slip ring.

FIG. 9 shows the pancake slip ring 20 relative to contact pin C, micro USB port G-1, and plug pins 110. The plug pins 110 may be used to make an electrical contact with components contained in an interchangeable top portion of case 10 (discussed below). The slip ring contacts 90 shown in FIG. 8-B are spaced so as to contact the rings of the pancake slip ring 20. FIG. 10 shows a cross-sectional view of the reel assembly I and the pancake slip ring 20. More specifically, FIG. 10 shows a gear 120 of the reel assembly I, cord L, reel 100, slip ring contacts 90, and pancake slip ring 20. This view shows how slip ring contacts 90 to which the cord wires 60 are attached contact the metal rings of the pancake slip ring 20. Both power and data are transferred to and from those rings, which then terminate into the contact pin C.

Figure 6:
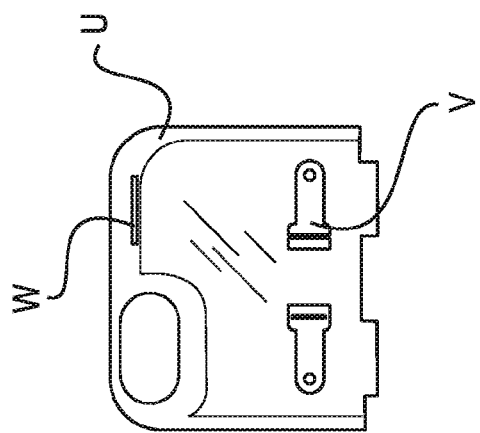
FIG. 6 shows the interchangeable transformer adapter top of the invention.
Figure 5:
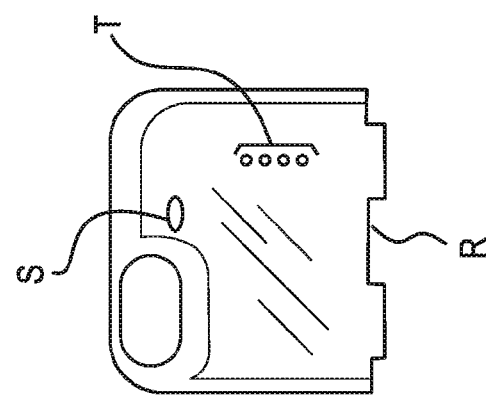
FIG. 5 shows the interchangeable supplemental battery top.
Figure 4:
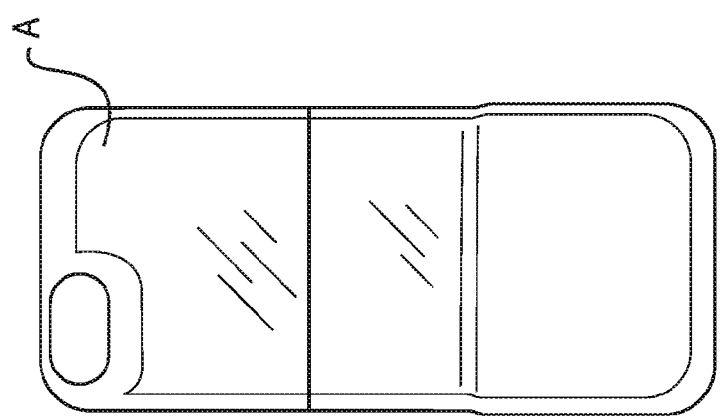
FIG. 4 shows the interchangeable capture top of the invention.

FIGS. 4, 5, and 6 show examples of interchangeable tops for the case 10. Each of the tops functions to lock the mobile device into the case 10, but then may have additional functions. In the presently described embodiment of the invention, there are three options that the user can choose depending on their mobile situation. FIG. 4 shows top A that functions solely as a capturing component to complete the locking of the device into the case.

FIG. 5 shows a top R, which is a top containing an onboard supplemental battery. As shown in FIG. 3, the battery top contains a battery 30 and a Fuel Gauge/Switch & OVP (over voltage protection circuit) 40. The battery allows the user, by means of the switch 40, to transfer power from the supplemental battery to the pancake slip ring 20 via contact pins on the reel & pancake slip ring. Power is transferred to the contact pin C plugged directly into the mobile device. Using this top the user can charge the mobile device in times of emergency for some additional percentage of battery life. Typically the user can achieve between 30 to 150% of additional battery life of the mobile device. It will be appreciated that batteries with various capacities can be used.

The top R shown in FIG. 5 also contains a circuit that allows for the monitoring of the supplemental batteries charge level, as depicted by the Fuel Gauge-Switch & OVP 40 shown in FIG. 3. The user can depress a button S on the back of the top R to display the battery level by means of 4 LED lights constituting a display T. The lights denote power level range, with one light representing 25% battery charge up to four lights representing 100% battery charge.

FIG. 6 shows a top U which is the third interchangeable top for the presently-described embodiment of the invention. The top U contains an onboard transformer adapter with fold-out plugs (i.e., prongs) V that allow the user to remove the top U and plug it into an outlet.

FIG. 6 shows that top U also contains a built-in USB port W that allows the user to then extend the onboard USB cord L and plug it into the USB port on transformer adaptor top U. This transfers power directly from any 110 volt outlet through the transformer adapter and to the pancake slip ring 20, which terminates to the contact pin that charges the mobile device. This interchangeable top allows the user to charge the mobile device in the case where a USB port is not available. Further, since the retractable cord L can be extended and connected to the transformer adaptor while the transformer adaptor is plugged into a power outlet, the user can easily continue to operate the phone (e.g., make calls, send emails or texts, or use apps on the phone) while the phone is charging.

Figure 11:
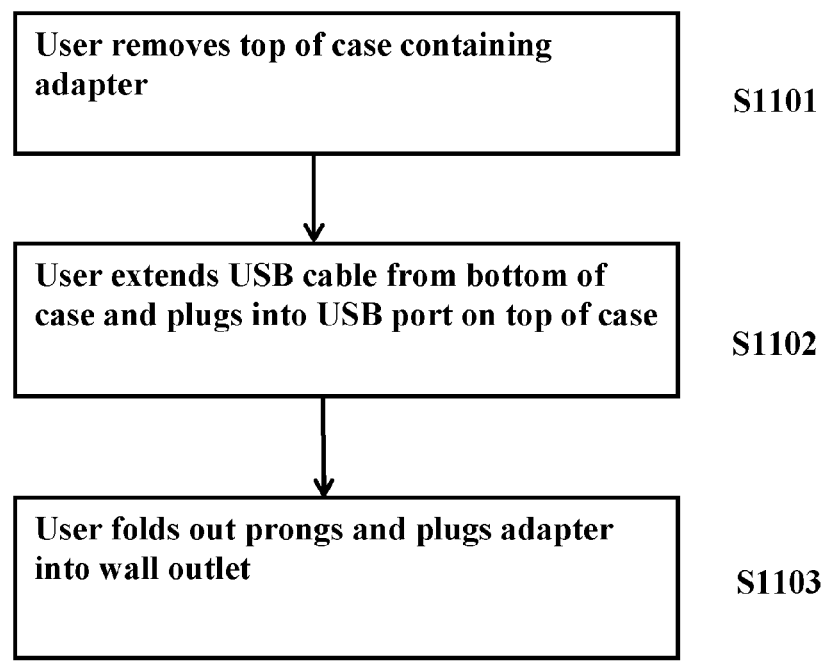
FIG. 11 is a flow diagram depicting a method of charging a mobile device using a retractable cable and a transformer adapter top of the mobile device case.

As mentioned above, according to one aspect of the present invention, when a top such as top U containing a transformer adapter is removably mated to the bottom of the case, a user is able to charge the mobile device without using (and without remembering to bring along) any other components or devices. FIG. 11 is a flow diagram depicting a method of charging a mobile device mounted in such a case. In step S1101, the user removes the top U containing the adapter. In step S1102, the user extends the USB cable L from the bottom section B of the case and plugs it into USB port W on top U. In step S1103, the user folds out prongs V on top U and plugs the adapter (i.e., top U) into a wall outlet. In this way, the user can charge the phone using only the built-in cable and adapter, without needing to carry along any additional components (such as cables, adapters, etc.). Moreover, because the charging is performed with the cable extended from the mobile device case, the user can continue to use the mobile device that is mounted in the case while charging occurs. Those skilled in the art will appreciate that the order of steps S1101 through S1103 may be varied.

In the presently-described embodiment, all of the tops are configured to mate to the bottom of the case 10 using a snap fit method. The tops contain several male protrusions that fit into corresponding openings in the bottom of the case 10. In particular, the male protrusions on the top align with female cavities on the bottom which have concave depressions. The male protrusions on the tops further have a mating male protrusion that utilizes a friction fit to allow the top and bottom to snap together in such a way so as not to allow the top to easily be removed. The friction fit is such that if needed the user can remove the top from the bottom using a reasonable force. One skilled in the art will appreciate that there are several possible configurations to removably connect a top and a bottom of the case 10.

Figure 7A:
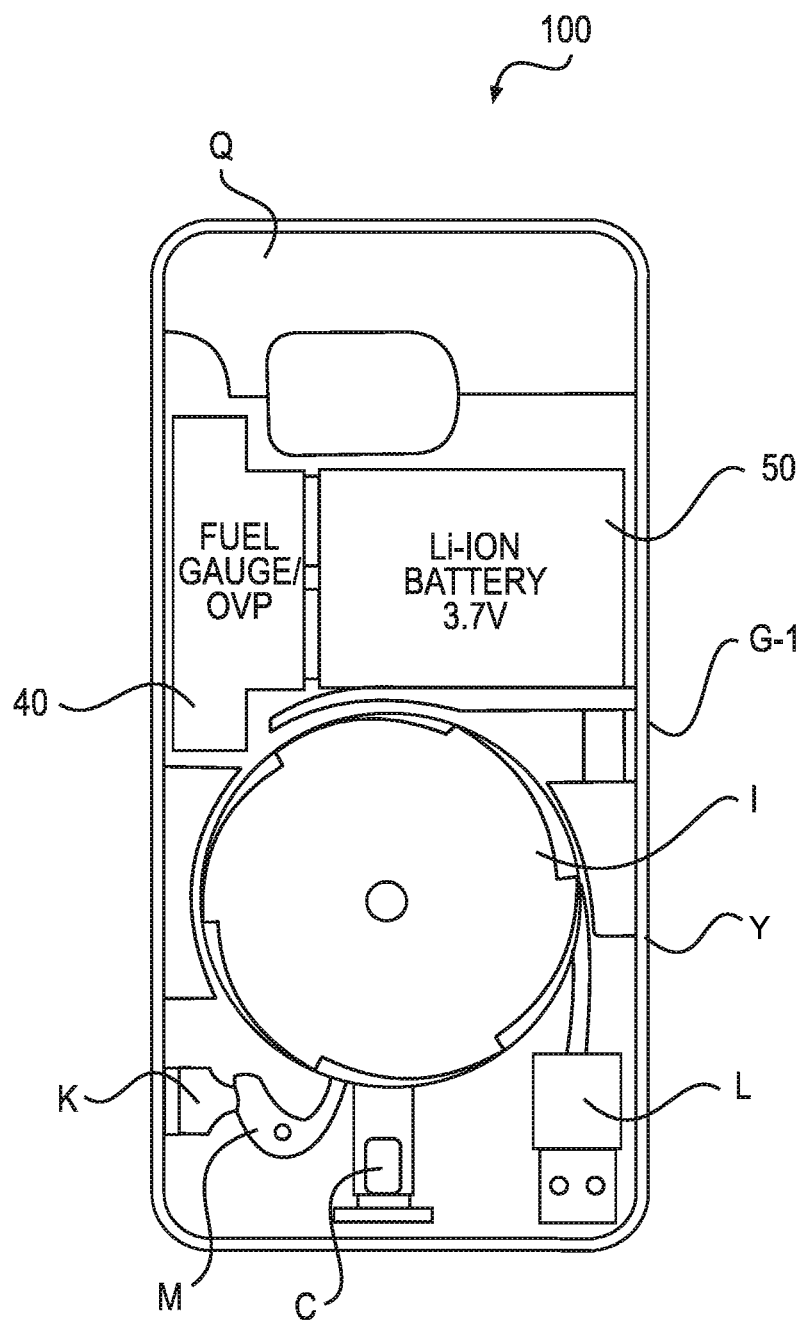
FIG. 7-A shows the internal mechanisms of a second embodiment of the invention, with no interchangeable tops and including the supplemental battery & retractable reel within the base of the case.
Figure 7B:
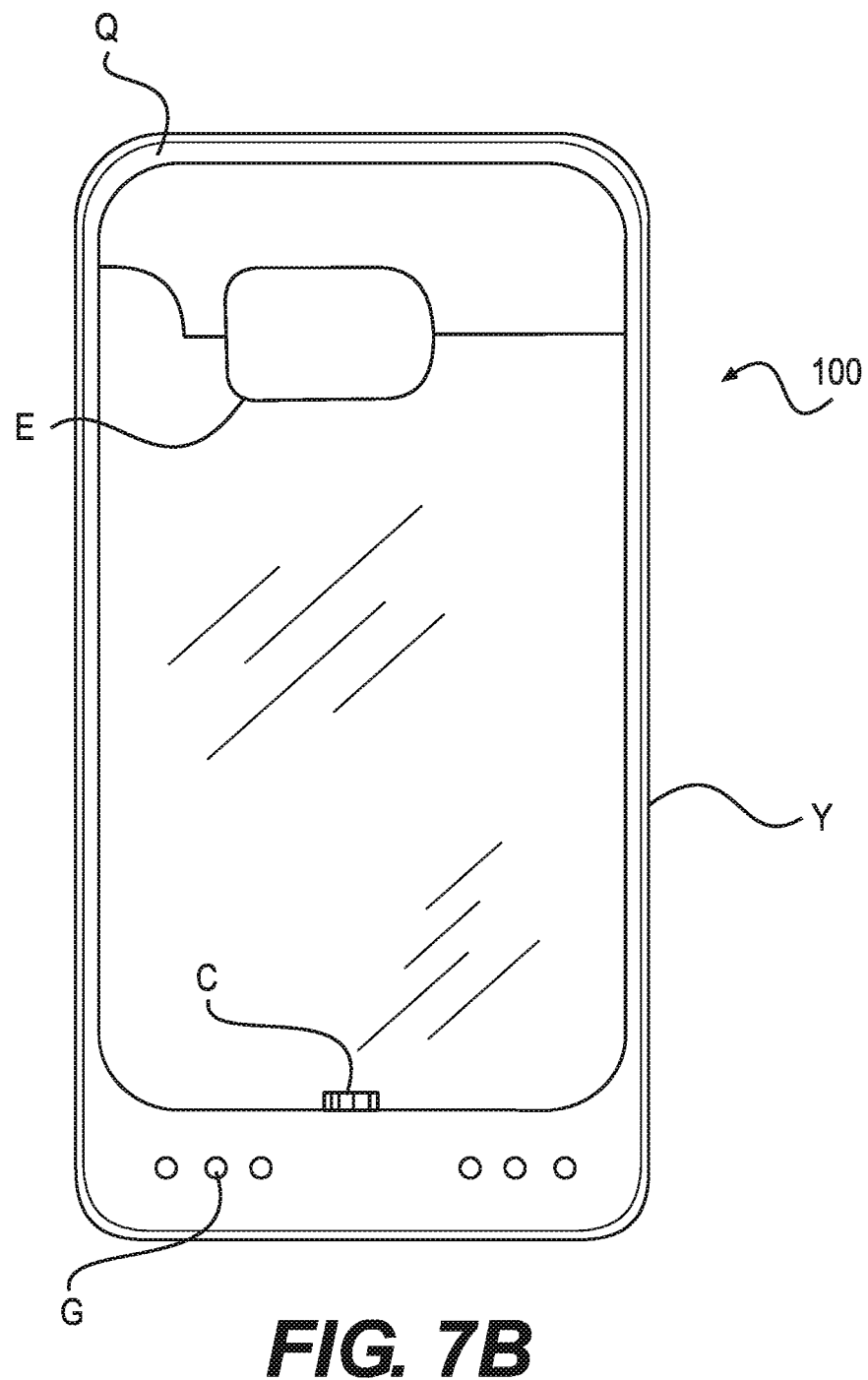
Figure 7C:
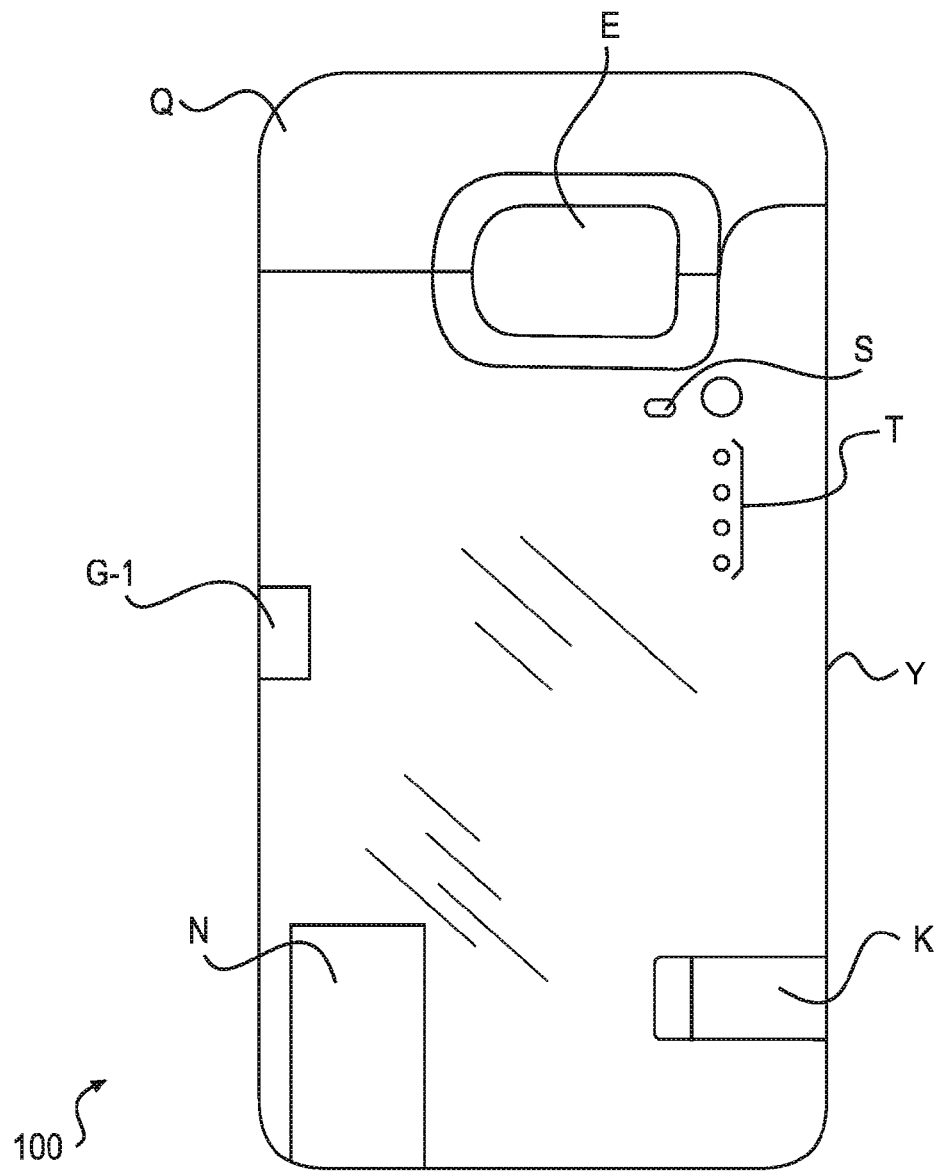

FIGS. 7-A, 7-B, and 7-C show another embodiment of the present invention in which the case 100 has a top Q and a bottom Y. The top Q in this embodiment has only the function of capturing and securing the mobile device in the case. The size of top Q may be different than that of top A. For example, as shown in FIGS. 7-A through 7-C, the top Q may be smaller than top A (and hence, the bottom Y will be larger than the bottom B used with top A). In this embodiment the case contains an onboard supplemental battery 50 that allows the user by means of a switch to transfer power from the battery to the pancake slip ring via contact pins to the pancake slip ring. Power will then be transferred to the contact pin connected directly to the mobile device. The user in this case can charge the mobile device in times of emergency for some percentage of additional battery life. Typically the user can achieve between 30 to 150% additional battery life of the mobile device.

Case 100 also contains a circuit that allows for the monitoring of the supplemental battery's charge level. Like the embodiment of case 10, the user can depress a button S on the back of the case to display the battery level by means of 4 LED lights constituting a display T. The lights denote power level range, with 1 light representing 25% battery charge to 4 lights representing 100% Battery charge.

Case 100 also contains the retractable USB cord as described with respect to case 10. In this embodiment both the retractable USB cord reel, and the locking mechanism as well as the supplemental battery are all contained in the lower portion of the phone case. Thus, the user in this embodiment maintains the ability to have the onboard supplemental battery power as well as the onboard retractable USB cord for charging from a USB port and performing data transfer without carrying a separate cord while on the go.

FIGS. 12 through 15 depict an alternative electrical contact system for transferring power and/or data between the end of cable L mounted on a retractable reel assembly and contact pin C that connects to a mobile device mounted in the case. In the electrical contact system described with respect to FIGS. 8-A through 8-D and FIG. 9 above, the metal slip ring contacts 90 on reel assembly 100 make contact with the metal bands of pancake slip ring 20. When the reel assembly is rotated, this creates friction between metal components that causes wear and can create dust. This can result in short circuits, and this electrical contact system can wear out relatively quickly. The alternative electrical contact system of FIGS. 12 through 15 has significant advantages over the pancake slip ring system.

Figure 12:
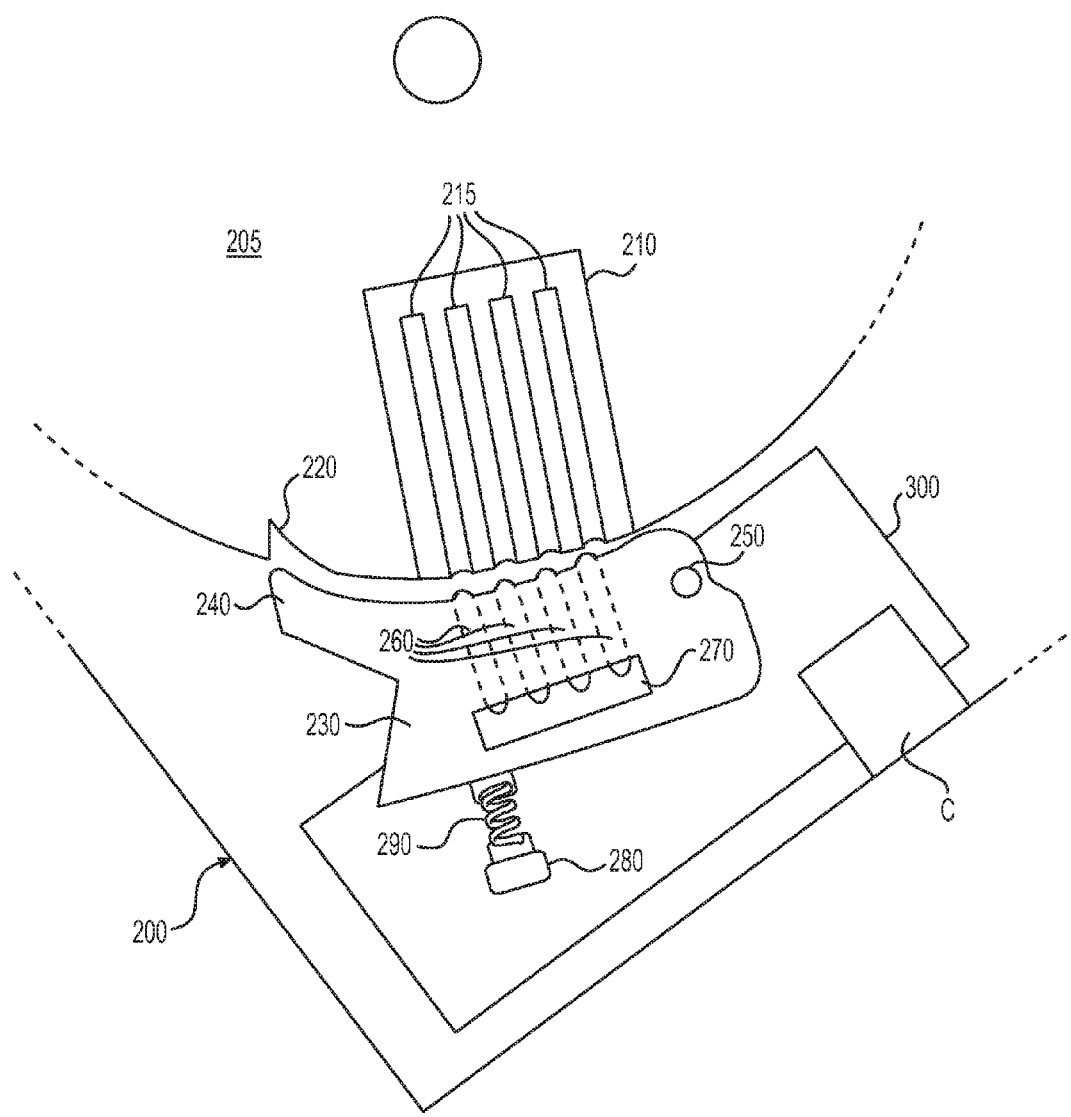
FIG. 12 shows an alternative mechanism for providing electrical contact between a reel assembly and a contact pin for transferring power to a mobile device mounted in the case, in a state where a pawl is disengaged from the reel assembly.

FIG. 12 is a partial view of a case 200 having an alternative electrical contact system according to another embodiment of the present invention. Case 200 can have separable top and bottom portions configured to retain a mobile device, as described with respect to the above preferred embodiments, and if desired it can have interchangeable tops as described above. In the above-described embodiments, the top and bottom sections form a two-part housing to hold a mobile device. Alternatively, case 200 can have a unitary housing to hold a mobile device (for example, a housing that does not have separable sections but instead has a flexible edge or rim to permit insertion of the mobile device). Case 200 also includes a reel 205, which is part of a reel assembly like that described above to permit a cable (preferably a USB cable) to be extended from and retracted back into case 200. The reel assembly includes a flat spring coil, a cable, and other components like those discussed above. Since the primary distinction between the currently described embodiment and the embodiments described above is in the electrical contact system, the description of the current embodiment will focus on the features of the electrical contact system.

Figure 13:
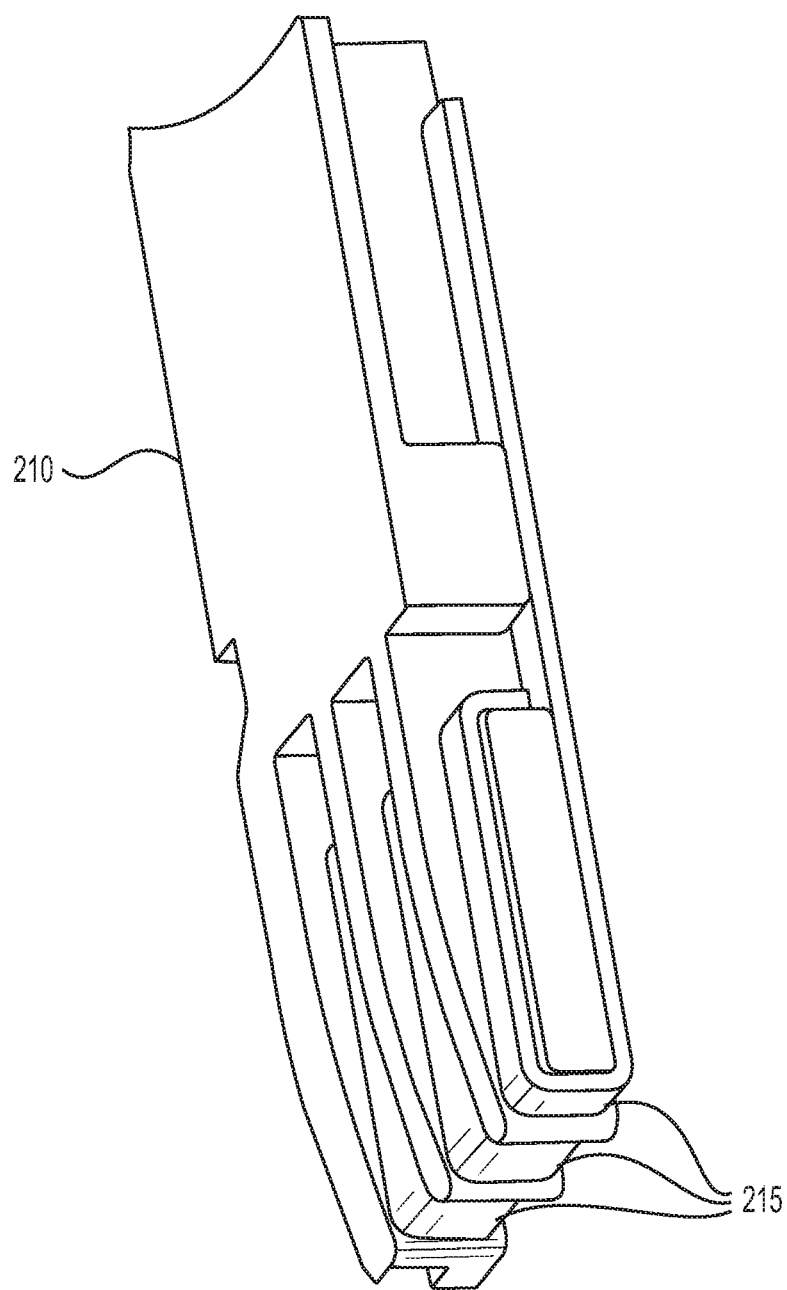
FIG. 13 shows a reel contact insert having multiple conductive strips.

Reel 205 includes a reel contact insert 210 having conductive strips 215. Preferably there are four conductive ships 215, two for power and two for data. FIG. 13 shows an expanded view of reel contact insert 210. (Only three of the conductive strips 215 can be seen in the perspective view shown in FIG. 13.) As depicted in FIGS. 12 and 13, conductive strips 215 have contact portions at the edge of reel contact insert 210 located at the circumferential periphery of reel 205. Preferably those contact portions are formed by wrapping conductive strips 215 around the edge of reel contact insert 210, and preferably these contact portions are indented with respect to the circumferential edge of reel 205. A cable mounted on the reel assembly is electrically connected to conductive strips 215 by soldering bare wires at one end of the cable to respective conductive strips, preferably at the opposite end of the strips from the contact portions. The use of a reel contact insert can simplify the manufacturing of the reel, but those skilled in the art will appreciate that conductive strips 215 can be provided on the reel in other ways that do not utilize a separate insert (for example, by depositing conductive material directly on the reel).

As seen in FIG. 12, case 200 further includes a pawl 230 mounted to case 200 so that it is pivotable about a post 250. A spring 290 connects pawl 230 to a post 280 to apply a bias force. Pawl 230 includes a claw or hook portion 240 that is engageable with a notch 220 on reel 205 to prevent reel 205 from turning in a counter-clockwise direction when engaged (i.e., to lock the reel assembly in position). FIG. 12 shows the case when the pawl is disengaged from the reel.

Pawl 230 includes a number of spring-loaded contact pins 260, which pass through the pawl so that one end of each contact pin 260 faces reel 205 and the other end extends to a slot 270 in pawl 230. Contact pins 260 are preferably spring-loaded so as to apply a bias in the direction of reel 205. Typically, the number of contact pins 260 is equal to the number of conductive strips 215 on the reel contact insert 210 (i.e., preferably four contact pins, with two for power and two for data). Each of contact pins 260 has a wire 267 (not shown in FIG. 12) soldered to the end extending to slot 270, and the wires pass down through slot 270 to electrical contacts on a circuit board 300. The wires have a small amount of slack so that they do not detach when pawl 230 pivots.

Figure 14:
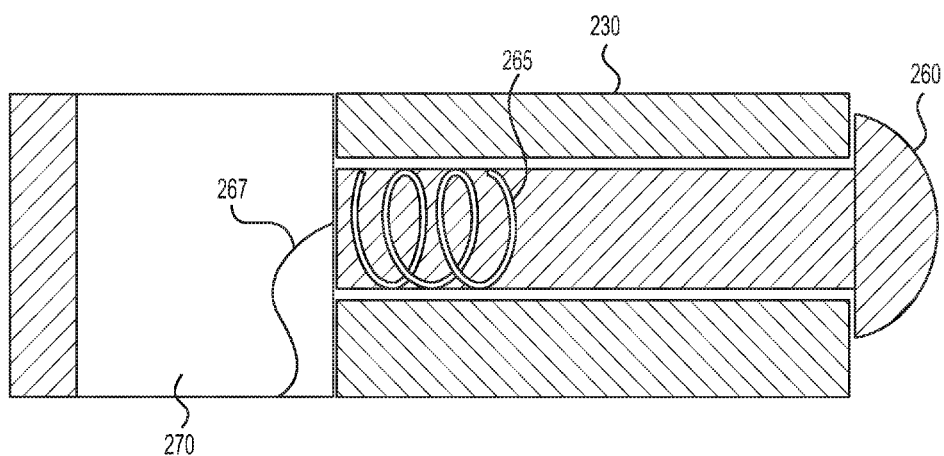
FIG. 14 shows a cross-section of a pawl containing spring-loaded contact pins.

FIG. 14 shows a cross-section of pawl 230. As shown in FIG. 14, each contact pin 260 has a spring 265 for urging the contact pin towards the reel assembly, and a wire 267 attached at the end of the contact pin extending through pawl 230 to slot 270. As mentioned above, each wire 267 electrically connects a respective contact pin 260 to circuit board 300.

Contact pin C, which provides an electrical connection to a mobile device mounted in case 200, also is electrically connected to circuit board 300. Electrical connections on circuit board 300 are configured to electrically connect wires 267 and contact pin C. Case 200 may also have a micro-USB charging port such as port G-1 described with respect to FIG. 1 and, if so, that port is also electrically connected to contact pin C via circuit board 300.

Figure 15:
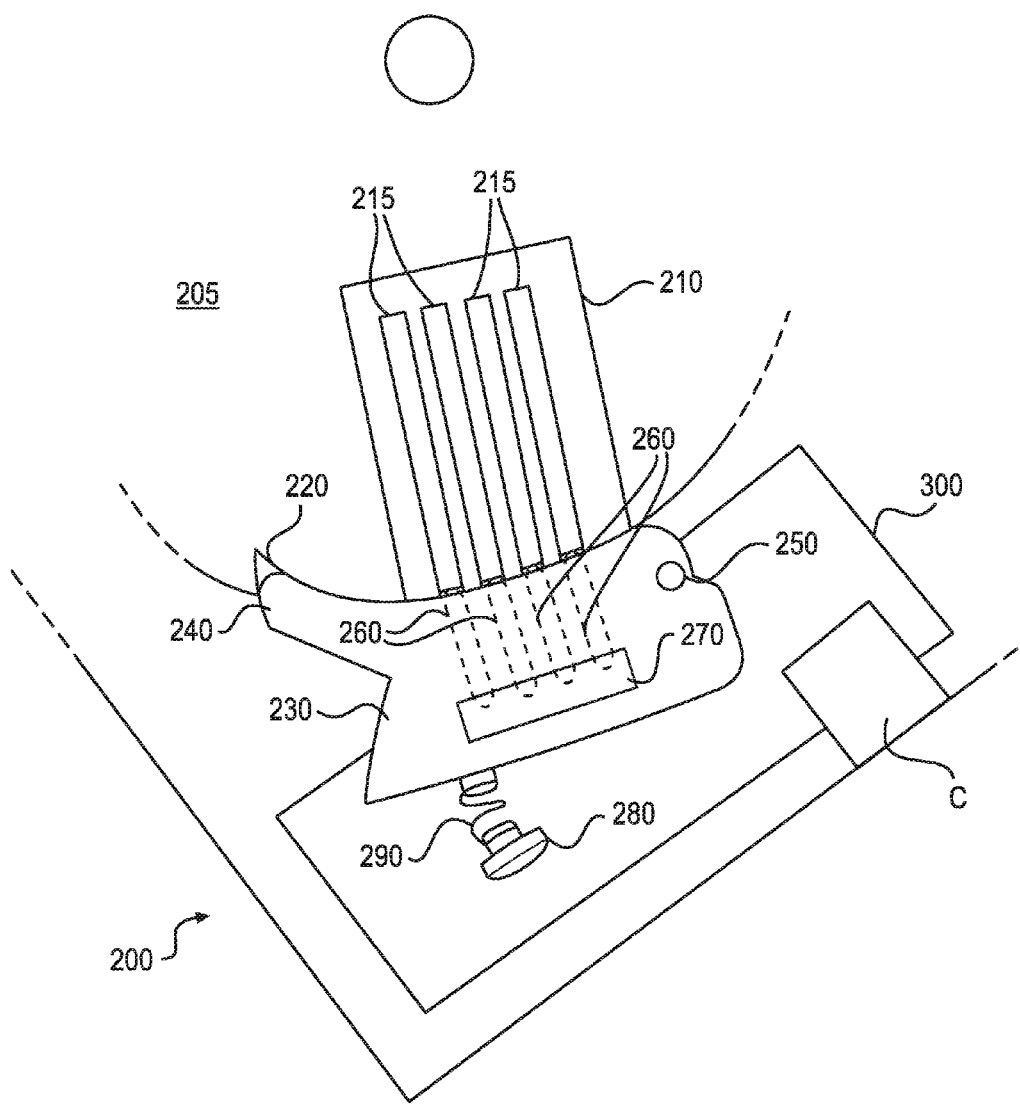
FIG. 15 is another view showing an alternative mechanism for providing electrical contact between a reel assembly and a contact pin for transferring power to a mobile device mounted in the case, in a state where a pawl is engaged with the reel assembly.

FIG. 15 shows the alternative electrical contact system of the present embodiment when pawl 30 is engaged with reel 205. When the pawl and reel are engaged, pawl 230 is pivoted against reel 205 so that spring-loaded contact pins 260 abut respective contact portions of conductive strips 215.

In operation, the alternative electrical contact system works as follows. Spring 290 urges pawl 230 toward reel 205. However, when the cable is extended from the case, reel 205 turns in a clockwise direction and the tip of claw 240 rides on the circumferential edge of reel 205, which pivots pawl 230 away from reel 205 (against the urging force of spring 290) and moves the tips of contact pins 260 away from reel 205. This ensures that, while reel 205 is moving, contact pins 260 do not touch conductive strips 215, so there is no metal-on-metal contact. To the extent contact pins 260 make contact with reel 205, they will be in contact with non-metallic material. Also, if contact pins 260 make contact with reel 205, they will be pushed into pawl 230 (against the urging of the respective springs 265) so as to avoid damage to contact pins 260 and/or reel 205.

While reel 205 is moved in the clockwise direction, the flat coil spring of the reel assembly tightens. When tension on the cable is released, the flat coil spring causes reel 205 to rotate counterclockwise. When claw 240 on pawl 230 reaches notch 220 on reel 205, claw 240 mates to notch 220 and prevents reel 205 from further movement in the counterclockwise direction. When claw 240 is mated with notch 220, pawl 230 is pressed against reel 205 and the tips of spring loaded contact pins 260 are urged toward reel 205 so that they abut (i.e., make electrical contact with) the contact portions of conductive strips 215. The contact between contact pins 260 and conductive strips 215 completes an electrical connection between a mobile device mounted in the case and a power and/or data source. Specifically, the connection according to the illustrated preferred embodiment is from the device to contact pin C, to circuit board 300, to wires 267, to spring-loaded contact pins 260, to conductive strips 215, to the bare wires of the cable that are soldered to conductive strips 215, and to the power and/or data source via the connector at the other end of the cable.

The alternative electrical contact system described with respect to FIGS. 12 through 15 has significant advantages over the contact system using a pancake slip ring. The tips of the spring-loaded contact pins 260 in the pawl do not contact the metal conductive strips 215 while the reel is rotating. Instead, because the claw portion of the pawl rides along the circumferential edge of the reel, the spring-loaded contact pins are either separated from the reel entirely or, if they contact the reel, it is not a metal-to-metal contact. The metal-to-metal contact between the spring-loaded contact pins and the conductive strips on the reel only occurs when the reel is stopped (i.e., when the cable is not being extended or retracted), which is when power and/or data transfer is actually needed. This greatly reduces wear and dust in the electrical contact system, thereby avoiding short circuits and increasing the operating life of the system. In addition, the alternative electrical contact system takes up significantly less space in the mobile device case, because there is no need for a pancake slip ring to be mounted parallel to the reel assembly.

As described above, the mobile device case according to the described preferred embodiments provides a way of charging the mobile device while in the case using a USB cord built into the case. (It is also possible to charge the device using a separate external cord, via a micro USB port built into the case. The mobile device is always mated to the protective case by means of the contact pin built into the base of the case when the device is captured into the case. Some or all edges of the case may be formed with protective ridges or protrusions, which can be formed from a variety of materials (including but not limited to rubber, latex, polycarbonate, leather, wood, minerals, or man-made synthetics or hybrids), to provide protection for the mobile device if dropped or receiving an impact. Thus, mobile device case provides protection from impacts, and provides various methods of charging and data transfer, all contained within the case system itself.

Those skilled in the art will recognize that many variations of the described embodiments are possible without departing from the scope of the invention. For example, although the described embodiments present a case having mated top and bottom parts, the relative size of those parts can be varied. Moreover, instead of a mated top and bottom part the case could be constituted from mated side parts or mated front and back parts. The specific location of the retractable USB cord or other described components in or on the case may also be varied.

We claim:

1. A case for a mobile device, comprising:
   a bottom section;
   a top section detachable from the bottom section, wherein the top section and the bottom section are configured to hold the mobile device;
   a device contact mounted on the bottom section and configured to provide electrical contact between the case and the mobile device;
   a retractable reel assembly contained within the bottom section, the retractable reel assembly holding a cable having a connector at one end; and
   an electrical contact system that electrically connects the cable on the retractable reel assembly to the device contact, wherein
   the top section contains (i) prongs that are moveable between a first position, in which the prongs can be inserted into a wall outlet, and a second position, in which the prongs are folded into the top section, (ii) a port configured to receive the connector on the one end of the cable, and (iii) a transformer electrically connected to the prongs and to the port;
   the retractable reel assembly has a notch on its circumferential periphery,
   the bottom section further comprises a pawl having a claw portion, the pawl being pivotably mounted on the bottom section so that the claw portion engages the notch on the retractable reel assembly when the pawl is pivoted toward the retractable reel assembly, and
   the electrical contact system comprises:
   a plurality of conductors on the retractable reel assembly, the plurality of conductors each having a respective contact portion adjacent to the circumferential periphery of the retractable reel assembly; and
   a plurality of contact pins on the pawl,
   wherein the pawl is disposed so that the plurality of contact pins on the pawl contact respective conductors on the retractable reel assembly when the claw portion on the pawl is engaged with the notch on the retractable reel assembly.

2. The case according to claim 1, where the connector is a USB connector and the port is a USB port.

3. The case according to claim 1, wherein the plurality of conductors comprises a plurality of parallel conductive strips extending in a radial direction from the circumferential periphery of the retractable reel assembly.

4. The case according to claim 1, wherein the plurality of contact pins are spring-loaded contact pins that pass through holes in the pawl.

5. A case system for a mobile device, comprising:
   a case having
   a bottom section;
   a first top section detachable from the bottom section, wherein the top section and the bottom section are configured to hold the mobile device;
   a device contact mounted on the bottom section and configured to provide electrical contact between the case and the mobile device;
   a retractable reel assembly contained within the bottom section, the retractable reel assembly holding a cable having a connector at one end; and
   an electrical contact system that electrically connects the cable on the retractable reel assembly to the device contact;
   wherein
   the retractable reel assembly has a notch on its circumferential periphery,
   the bottom section further comprises a pawl having a claw portion, the pawl being pivotably mounted on the bottom section so that the claw portion engages the notch on the retractable reel assembly when the pawl is pivoted toward the retractable reel assembly, and
   the electrical contact system comprises:
   a plurality of conductors on the retractable reel assembly, the plurality of conductors each having a respective contact portion adjacent to the circumferential periphery of the retractable reel assembly; and
   a plurality of contact pins on the pawl,
   wherein the pawl is disposed so that the plurality of contact pins on the pawl contact respective conductors on the retractable reel assembly when the claw portion on the pawl is engaged with the notch on the retractable reel assembly; and a second top section, interchangeable with the first top section, the second top section including one of
   a. an adapter having (i) prongs that are moveable between a first position, in which the prongs can be inserted into a wall outlet, and a second position, in which the prongs are folded into the second top section, (ii) a port configured to receive the connector on the one end of the cable, and (iii) a transformer electrically connected to the prongs and to the port; and
   b. a backup battery.

6. The case system according to claim 5, wherein the second top section includes the backup battery and the case system further comprises a third top section, interchangeable with the first top section, including the adapter.

7. The case according to claim 5, wherein the plurality of conductors comprises a plurality of parallel conductive strips extending in a radial direction from the circumferential periphery of the retractable reel assembly.

8. The case according to claim 5, wherein the plurality of contact pins are spring-loaded contact pins that pass through holes in the pawl.

9. A case for a mobile device, comprising:
   a housing configured to hold the mobile device;
   a device contact mounted on the housing and configured to provide electrical contact between the case and the mobile device;
   a retractable reel assembly contained within the housing, the retractable reel assembly having a notch on its circumferential periphery and holding a cable having a connector at one end;
   a pawl contained within the housing, the pawl having a claw portion and being pivotably mounted on the housing so that the claw portion engages the notch on the retractable reel assembly when the pawl is pivoted toward the retractable reel assembly; and
   an electrical contact system that electrically connects the cable on the retractable reel assembly to the device contact, wherein the electrical contact system comprises:
      a plurality of conductors on the retractable reel assembly, the plurality of conductors each having a respective contact portion adjacent to the circumferential periphery of the retractable reel assembly; and
      a plurality of contact pins on the pawl,
      wherein the pawl is disposed so that the plurality of contact pins on the pawl contact respective conductors on the retractable reel assembly when the claw portion on the pawl is engaged with the notch on the retractable reel assembly.

10. The case according to claim 9, wherein the plurality of conductors comprises a plurality of parallel conductive strips extending in a radial direction from the circumferential periphery of the retractable reel assembly.

11. The case according to claim 9, wherein the plurality of contact pins are spring-loaded contact pins that pass through holes in the pawl.

12. The case according to claim 9, wherein the housing comprises a bottom section and a top section detachably separable from the bottom section, and wherein the top section contains an adapter having (i) prongs that are moveable between a first position, in which the prongs can be inserted into a wall outlet, and a second position, in which the prongs are folded into the top section, (ii) a port configured to receive the connector on the one end of the cable, and (iii) a transformer electrically connected to the prongs and to the port.

* * * * *